Figure 1:
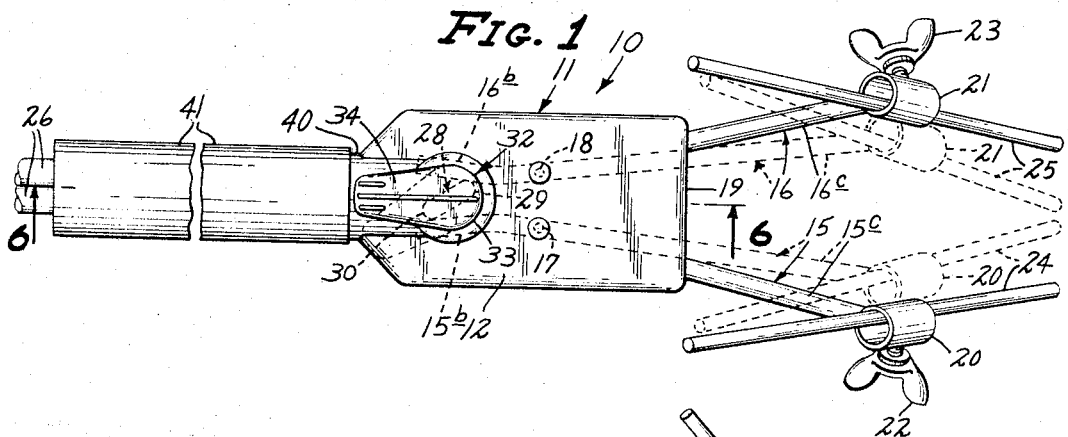

Oct. 31, 1967

A. R. ANDRE 3,350,540

CARBON ARC TORCH

Filed Nov. 12, 1964

2 Sheets-Sheet 1

INVENTOR.
ALLEN R. ANDRE
BY
Merchant, Merchant & Gould
ATTORNEYS

Oct. 31, 1967   A. R. ANDRE   3,350,540
CARBON ARC TORCH
Filed Nov. 12, 1964   2 Sheets-Sheet 2
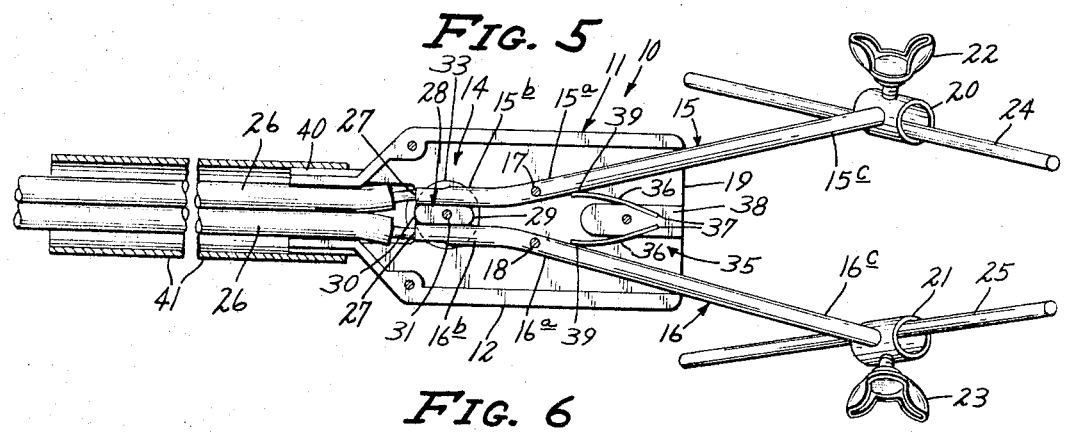
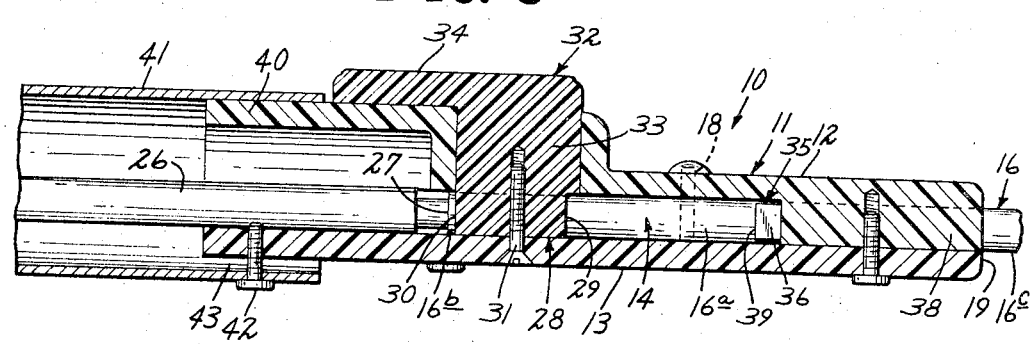
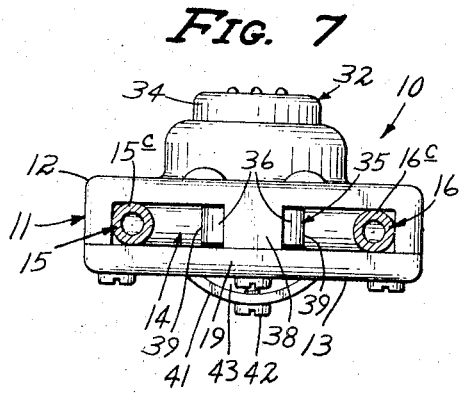 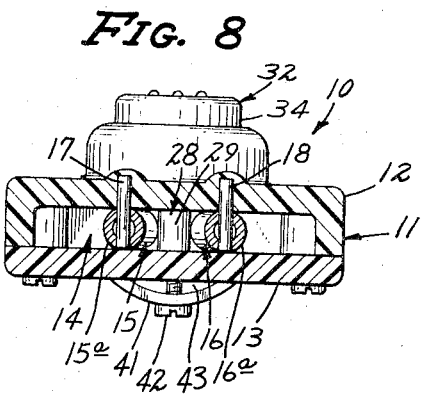
INVENTOR.
ALLEN R. ANDRE
BY
Merchant, Merchant & Gould
ATTORNEYS

United States Patent Office 3,350,540
Patented Oct. 31, 1967

3,350,540
CARBON ARC TORCH
Allen R. Andre, Box 1113, Bismarck, N. Dak. 58501
Filed Nov. 12, 1964, Ser. No. 410,578
5 Claims. (Cl. 219—139)

My invention relates generally to welding equipment, and more particularly to improvements in carbon arc torches for this purpose.

In torches of the type above described, the carbon rods are mounted for swinging movements towards and away from each other in clamping devices which maintain them so that they converge in the direction of their working tips. As these working tips become burnt away by use, it becomes necessary to readjust the spacing to compensate therefore.

The primary object of my invention is the provision of novel means for accurately, and with facility, moving the carbon tips from their normal inoperative position to their most efficient operative positions, and in maintaining them by adjustment in said operative positions as they become shortened by such use.

A further object of my invention is the provision of a device of class described which is light in weight and compact in size so as to facilitate storage and shipment.

A further object of my invention is the provision of a device of the class described which incorporates but a minimum of working parts, is foolproof in its operation, and is rugged and durable.

The above and still further objects of my invention will become apparent from the following detailed specification, appended claims, and attached drawings.

Figure 2:
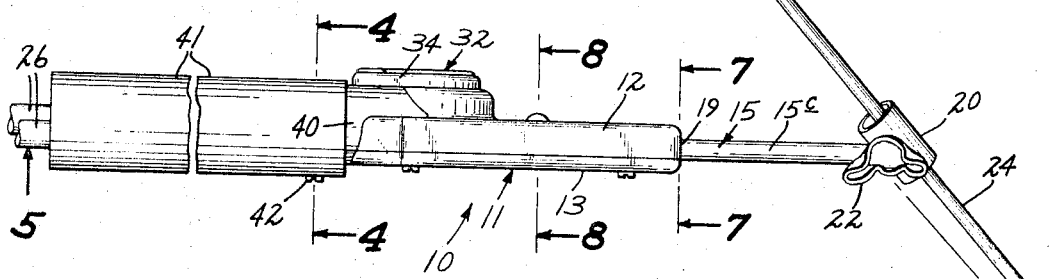
Figure 3:
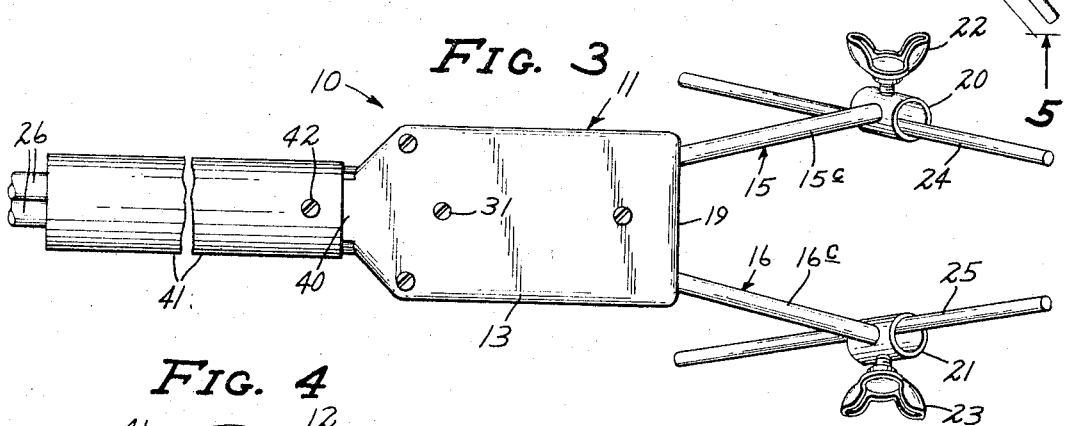
Figure 4:
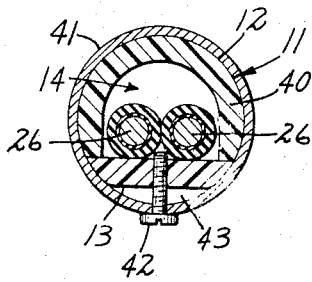

Referring to the drawings wherein like characters indicate like parts throughout the several views:

FIG. 1 is a view in top plan of my novel structure;
FIG. 2 is a view in side elevation;
FIG. 3 is a view in bottom plan;
FIG. 4 is a view in section taken on the line 4—4 of FIG. 2 on an enlarged scale;
FIG. 5 is a view in horizontal section as seen along the irregular line 5—5 of FIG. 2;
FIG. 6 is a view in axial section as seen from the line 6—6 of FIG. 1 on an enlarged scale;
FIG. 7 is a section view as seen from the line 7—7 of FIG. 2 on an enlarged scale; and
FIG. 8 is a view in section as seen from the line 8—8 of FIG. 2 on an enlarged scale.

Referring with greater particularity to the drawings, there is shown a carbon torch indicated generally by the numeral 10. Torch 10 includes a body 11 which is formed from heat resistant maetrial such as Bakelite, and comprises first and second body sections 12, 13 respectively. As shown, body section 13 is planar in nature and serves as a cover member for body section 12, body section 12 being so formed so as to define, together with cover member 13, an axially extended cavity 14. A pair of longitudinally extended laterally spaced arms 15, 16 have their intermediate portions 15a, 16a mounted on spaced parallel axes 17, 18 for swinging movements of their opposite end portions towards and away from each other, the inner end portions 15b, 16b being within the cavity 14.

The outer end portions 15c, 16c of the arms 15, 16 project forwardly through the open forward end 19 of the body 11 in diverging relationship to each other, and terminate in carbon rod clamping elements 20, 21, respectively. As shown, the axes of the carbon rod clamping elements 20, 21 are disposed in a converging relationship one to the other and are adapted by means of the thumb screws 22, 23 to clamp the carbon rods 24, 25 in such a relationship, as shown particularly in FIGS. 1, 3 and 5. The inner end portions 15b, 16b of the arms 15, 16 are connected one each to an electrical conductor element 26 as indicated generally at 27. Conductor elements 26 in turn are operatively associated with a source of power, not shown.

The cam acting spreader element in the nature of an elongated rib 28 is shown as being interposed between the inner ends 15b, 16b. Rib 28 is provided at its forward and rearward ends with cam surfaces 29, 30 respectively for a purpose which will hereinafter become apparent, and is mounted for pivotal movement about an axis normal to the longitudinal axis of body member 11 and parallel to the axes 17, 18 of the arms 15, 16. It will be noted that the pivotal axis indicated at 31 of the rib 28 is offset from the longitudinal center of said rib toward the cam acting surface 29 thereof so as to equalize the spreading movements imparted to the inner end portions 15b, 16b of the arms 15, 16 during pivotal movements of the rib 28.

Formed integrally with the rib 28 and adapted to impart pivotal movements thereto about the axis 31 is a cross-sectionally L-shaped lever 32. Lever 32 is comprised of a leg 33 which is journalled for rotation in the body 11 on the axis 31 and has a second leg portion 34 which is disposed exteriorly of the body 11 and projects rearwardly along the longitudinal axis thereof. Lever portion 34 is adapted to be engaged by the thumb of the user, not shown, so as to impart rotary movements to the leg section 33 and rib 28. Yielding means for maintaining the inner end portions 15b, 16b of the arms 15, 16 in engagement with the rib 28 is indicated generally by the numeral 35. Yielding means 35 is shown as including a pair of leaf springs 36, common ends 37 of which are anchored by means of the boss 38 carried by the body section 12 of body 11. Opposite ends 39 of springs 36 are one each engageable with one of the arms 15, 16 at a point intermediate the pivotal axis 17, 18 thereof in the forward end 19 of body 11 and the clamping elements 20, 21. With this arrangement, the arms 15, 16 and carbon rods 24, 25 carried thereby are maintained in a spaced apart inoperative position as shown by the full lines in FIGS. 1 and 5.

For the purpose of providing a handle for the body 12, same includes a tubular extension 40 which projects rearwardly from the body 12 and has telescopically received thereover a tubular handle element 41, same being secured to the tubular extension 40 by means of the head-equipped screw 42. Handle element 41 together with tubular extension 40 cooperate to form a passage through which electrical conductors 26 enter the cavity 14. With particular reference to FIGS. 4 and 6, it will be noted that the tubular extension 40 is so formed along one side thereof so as to define along with the handle 41 an open-ended vent passage 43. Vent passage 43 is so disposed so as to permit circulation of cooling air through the handle 41 and thereby disperse heat conducted by the arms 15, 16 through the body 12 to handle 41.

When it is desired to put the torch 10 into operation, a user has merely to grasp the handle with his thumb in engagement with the lever portion 34. Movement of lever portion 34 from the full line position of FIG. 1 to the dotted line position thereof causes the cam surfaces 29, 30 of rib 28 to engage the inner end portions 15b, 16b of arms 15, 16, and thus move same to the dotted line position shown in FIG. 1. When it becomes necessary to readjust the carbon rods 24, 25 due to the burning away of the working tips thereof, one merely applies slight pressure to the lever portion 34. It will be noted with respect to FIG. 1 that torch 10 is adaptable to either a right or left handed user merely by reversing the direction of pressure applied to lever portion 34.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:
1. In a device of the class described:
   (a) an elongated tubular open-ended body,
   (b) a pair of longitudinally extended laterally spaced arms,
   (c) means pivotally mounting the intermediate portions of said arms on parallel axes within said body for swinging movements of the opposite ends thereof towards and away from each other,
   (d) the outer end portions of said arms projecting outwardly from the open front end of said body in diverging relationship and being provided at their extreme ends with carbon rod clamping elements,
   (e) the inner end portions of said arms terminating within said body in closely spaced generally parallel relationship and being adapted for connection, one each to an electrical conductor element entering said body from the open rear end thereof,
   (f) a cam acting spreader element interposed between said inner end portions of said arms,
   (g) means for imparting rocking movements to said spreader element, and
   (h) yielding means maintaining said inner end arm portions in engagement with said spreader element.
2. The structure defined in claim 1 in which:
   (a) said spreader element is in the nature of an elongated rib, the front and rear ends of which define cam surfaces,
   (b) said rib being mounted for pivotal movements about an axis normal to the longitudinal axis thereof and parallel to the axes of said arms,
   (c) said pivot axis being offset from the longitudinal center of said rib toward the forward end thereof so as to equalize the spreading movement imparted thereby to said arms,
   (d) said means for imparting pivotal movements to said rib including a cross-sectionally L-shaped lever, one leg of which is disposed exteriorly of said body and projects rearwardly along the longitudinal axis thereof,
   (e) the other leg of said lever being journalled for rotation in said body with said rib secured thereto for common pivotal movements therewith.
3. The structure defined in claim 1 in which said body includes a tubular extension projecting rearwardly therefrom and formed integrally therewith, in further combination with a tubular handle telescopically received over said extension and detachably secured thereto, said tubular handle and tubular extension cooperating to define an axially extended open-ended vent passage disposed radially of the axes of each thereof.
4. The structure defined in claim 1 in which said body comprises a first body member and a second body member, one of said members being in the nature of a planar cover, and in which said other body member defines a cavity for the reception of the inner end portions of said arm and said spreader element.
5. The structure defined in claim 1 in which said yielding means includes a pair of leaf springs, common ends of which are anchored on said body within the cavity defined thereby and along the longitudinal axis thereof, with the other end of said leaf springs engageable on each with one of said arms at a point intermediate the pivotal axis thereof and the forward end of said body.

References Cited

UNITED STATES PATENTS

| | | | |
|---|---|---|---|
| 2,520,151 | 8/1950 | Landis et al. | 219—139 |
| 3,012,131 | 12/1961 | Forney | 219—139 |
| 3,035,155 | 5/1962 | Hawk | 219—139 |

RICHARD M. WOOD, *Primary Examiner.*

W. D. BROOKS, *Assistant Examiner.*